United States Patent
Baker et al.

(10) Patent No.: US 7,401,162 B2
(45) Date of Patent: Jul. 15, 2008

(54) MULTI-FUNCTIONAL PORT

(75) Inventors: Keith Baker, Missisauga (CA);
Lawrence David Forsythe, Milton (CA); Marija Gajic-Mancic, Oakville (CA)

(73) Assignee: Psion Teklogix Inc., Mississauga ON (CA)

( * ) Notice: Subject to any disclaimer, the term of this patent is extended or adjusted under 35 U.S.C. 154(b) by 113 days.

(21) Appl. No.: 10/624,507

(22) Filed: Jul. 23, 2003

(65) Prior Publication Data
US 2005/0021890 A1    Jan. 27, 2005

Related U.S. Application Data

(60) Provisional application No. 60/488,795, filed on Jul. 22, 2003.

(51) Int. Cl.
*G06F 3/00* (2006.01)

(52) U.S. Cl. .......................................... 710/8; 709/250

(58) Field of Classification Search ............... None
See application file for complete search history.

(56) References Cited

U.S. PATENT DOCUMENTS

| | | | |
|---|---|---|---|
| 4,794,525 A * | 12/1988 | Pickert et al. ............... | 713/300 |
| 5,081,627 A * | 1/1992 | Yu .............................. | 714/46 |
| 5,243,623 A | 9/1993 | Murdock | |
| 5,264,958 A | 11/1993 | Johnson | |
| 5,497,460 A * | 3/1996 | Bailey et al. ................. | 714/39 |
| 6,018,549 A | 1/2000 | Reay et al. | |
| 6,072,803 A * | 6/2000 | Allmond et al. ............ | 370/445 |
| 6,088,754 A | 7/2000 | Chapman | |
| 7,069,346 B2 * | 6/2006 | Lee ............................ | 709/250 |
| 2002/0069300 A1 * | 6/2002 | Pascolini .................... | 709/250 |

OTHER PUBLICATIONS

Derfler, Frank J. and Freed, Les, How Networks Work, Sep. 2000, Que Corporation, Millenium Edition, p. 49.*

* cited by examiner

*Primary Examiner*—Alford Kindred
*Assistant Examiner*—Eron J Sorrell
(74) *Attorney, Agent, or Firm*—John D. Harris; Gowling Lafleur Henderson LLP

(57) ABSTRACT

A multi-protocol port interface coupled to a plurality of selectable circuits, each of the circuits being associated with an electrical interface standard and selectable via a mode-select input signal in order to facilitate communication with a peripheral device coupled to the port, the peripheral device having a circuit chosen from the plurality of selectable circuits and associated with an electrical interface standard.

18 Claims, 3 Drawing Sheets

MULTI-FUNCTIONAL PORT

This application claims the benefit of U.S. Provisional Application 60/488,795, entitled "Multi-Functional Port", filed on Jul. 22, 2003.

BACKGROUND OF THE INVENTION

1. Field of the Invention

The present invention is related to electrical interfaces, more particularly it relates to a multi-protocol electrical interface.

2. Description of the Prior Art

Serial communications, synchronous or asynchronous are typically defined by standards, such as those set by the Electronic Industries Association/Telecommunications Industry Association (EIA/TIA). These standards define interfaces such as, but not limited to, EIA/TIA-232, ELI/TIA-449, EIA/TIA-530, and EIA/TIA-530A, which are also well known in the industry under the former EIA prefix "RS-" (Recommended Standard) as RS-232, RS-449, RS-530, and RS-530A. Additional interfaces include International Telecommunications Industry (ITU) X.21 and V.35. Also, the Institute of Electrical and Electronics Engineers (IEEE) 1284 standard define interfaces for parallel communications. These standards define communication protocols, signal levels, maximum bandwidth, connector pin-out, supported handshaking signals, drive capabilities, and electrical characteristics of the serial or parallel lines for data exchange.

Typically, each serial interface operates either as a data terminal equipment (DTE) or a data circuit-terminating equipment (DCE). Typically, a terminal or computer is referred to as the DTE and a modem is typically referred to as the DCE. A signal that is an output on a DTE is the input to a DCE on the opposite end of the serial interface. Generally, the DTE and the DCE have complementary mechanical connectors, which can be coupled to allow an interchange of binary signals between the electrical interface standards in the industry. With the abundance of interface standards in use it is difficult to design DTEs that will interconnect with the wide range of available DCEs. Most existing DTE interconnection devices only support a single type of interface. In order to perform the data exchange according to the selected protocol it is necessary to establish a number of electrical connectors having predetermined characteristics. Typically this is done by a mechanical connector having a defined configuration of pins, e.g. a RS 232 DB-9 connector with 9 pins or a DB 25 with 25 pins.

Several attempts have been made to develop a DTE interface that will support multiple interface standards.

In other DTEs and DCEs, this problem is solved by having a separate cable for each of the interface standards and by routing the signals, depending upon which standard is being used, to a corresponding receiver or set of receivers. In this example, a common connector is used at the interchange interface and has a group of pins dedicated to signals that are unique to each interface standard. This method, however, requires larger connector space.

Another solution has been to include a number of interface boards in the DTE or DCE, each board corresponding to a particular electrical interface standard. These boards remain available at all times so that they may be switched into and out of the respective DTE or DCE depending upon which electrical interface standard is being implemented at that time. When not in use these boards are left idle or are removed and can be easily lost or damaged.

Therefore, these solutions require additional hardware that can be easily misplaced and needs to be at an arm's length to cater for the different application environments. Also, there is substantial time expended configuring the DTE to the DCE. Some devices use a single connector to accommodate all the different possible industry interfaces; however, this makes for a rather bulky and expensive connector. These proposed solutions are not ideal for portable or handheld computers, where portability, flexibility and a minimum footprint are most desirable. These hand-held computers may be used in harsh environments such as industrial plants where there could be hazardous materials or measurements performed in confined spaces, and the connectors must withstand the physical conditions imposed by these environments. The cost of a ruggedised, large connector is prohibitive.

It is therefore an object of this invention to mitigate or obviate at least one of the above-mentioned disadvantages.

SUMMARY OF THE INVENTION

In one of its aspects the present invention provides DTE comprising a port;

at least one signal line connected to said port to establish a communication path;

a set of transceivers, each associated with a respective circuit in said DTE to establish communication along said communication path in accordance with a selected protocol;

a switch in each of said signal lines, each of said switches having a set of connections with each of said connections associated with a respective one of said transceivers; and a control signal to condition said switches to connect all of said signal lines with a connection associated with a selected one of said transceivers In another aspect of the invention of the invention, there is provided an interface system for coupling a plurality of signals between a DTE and a DCE via a plurality of communication paths, said system having:

a DTE port having at least one signal line to establish one of said plurality of communication paths, said DTE having a set of transceivers each associated with a respective circuit in said DTE to establish communication along said communication path in accordance with a selected protocol;

a DCE port having at least one signal line to establish one of said plurality of communication paths, said DTE having an interface driver circuit to establish communication along said communication path in accordance with said selected protocol;

a switch in each of said signal lines, each of said switches having a set of connections with each of said connections associated with a respective one of said transceivers; and a control signal to condition said switches to connect all of said signal lines with a connection associated with a selected one of said transceivers.

Advantageously, the number of connector pins is minimised, as none of the connector pins are dedicated to a particular electrical interface standard or to individual signals. Therefore, the connector is less expensive, easier to manufacture, more robust and thus ideal for handheld devices that need to accommodate peripheral devices having various electrical interfaces.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
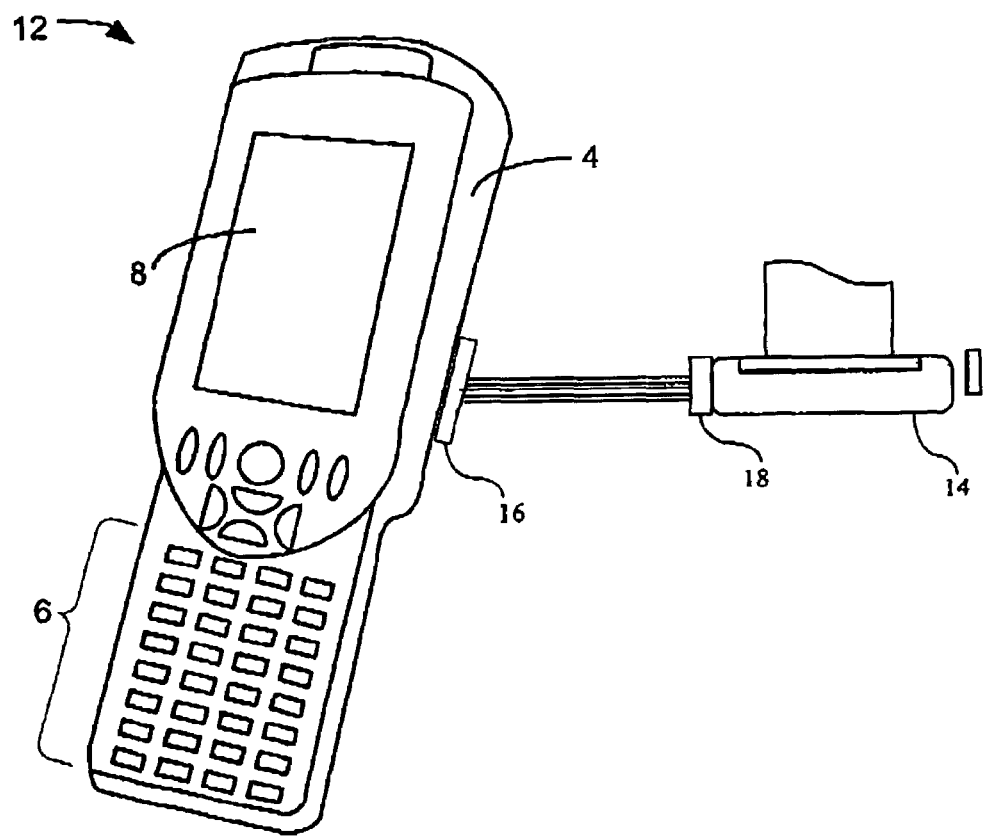
FIG. 1 is a perspective view of a hand held scanner and peripheral device.
Figure 2:
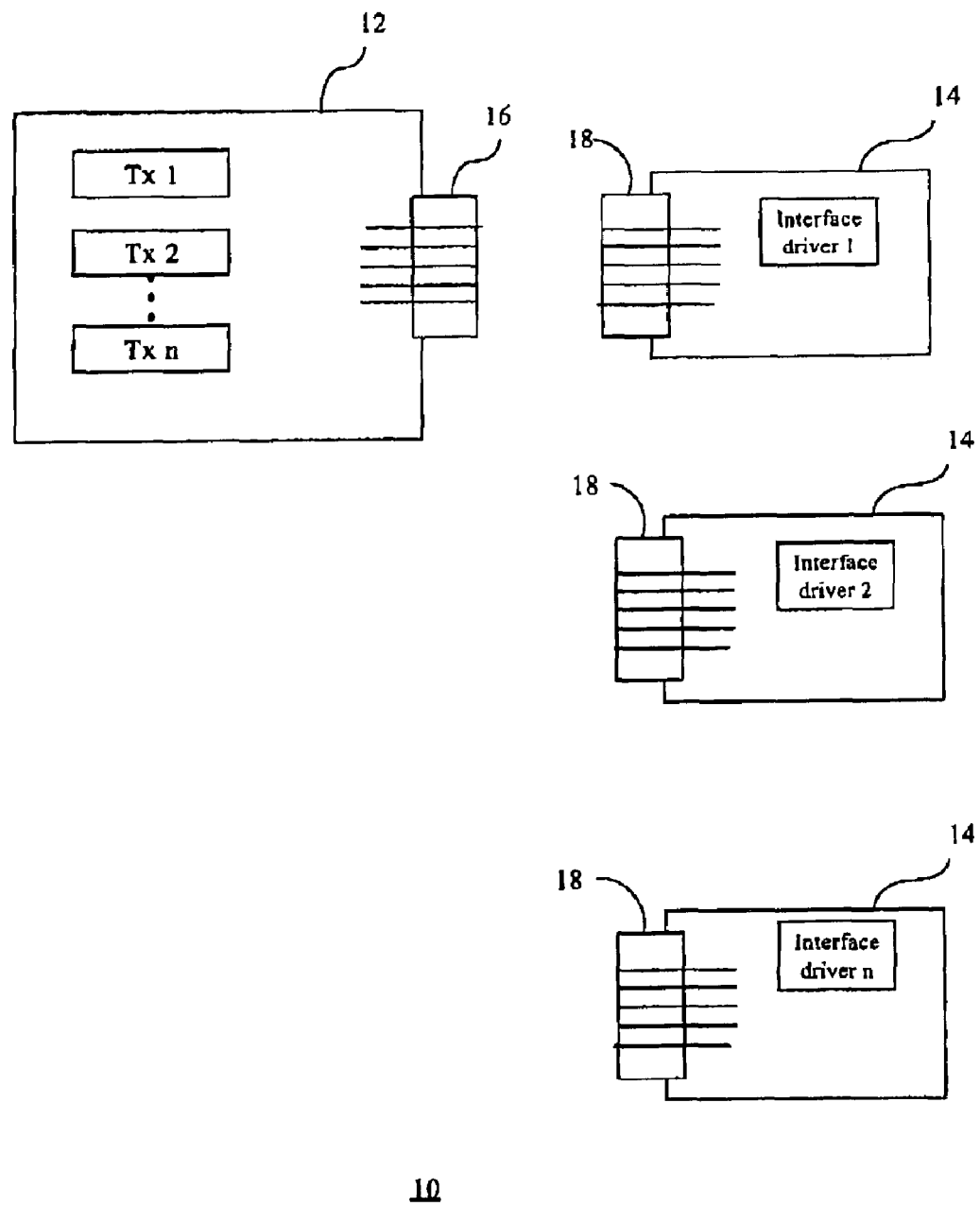
FIG. 2 is a schematic representation of a communication network.
Figure 3:
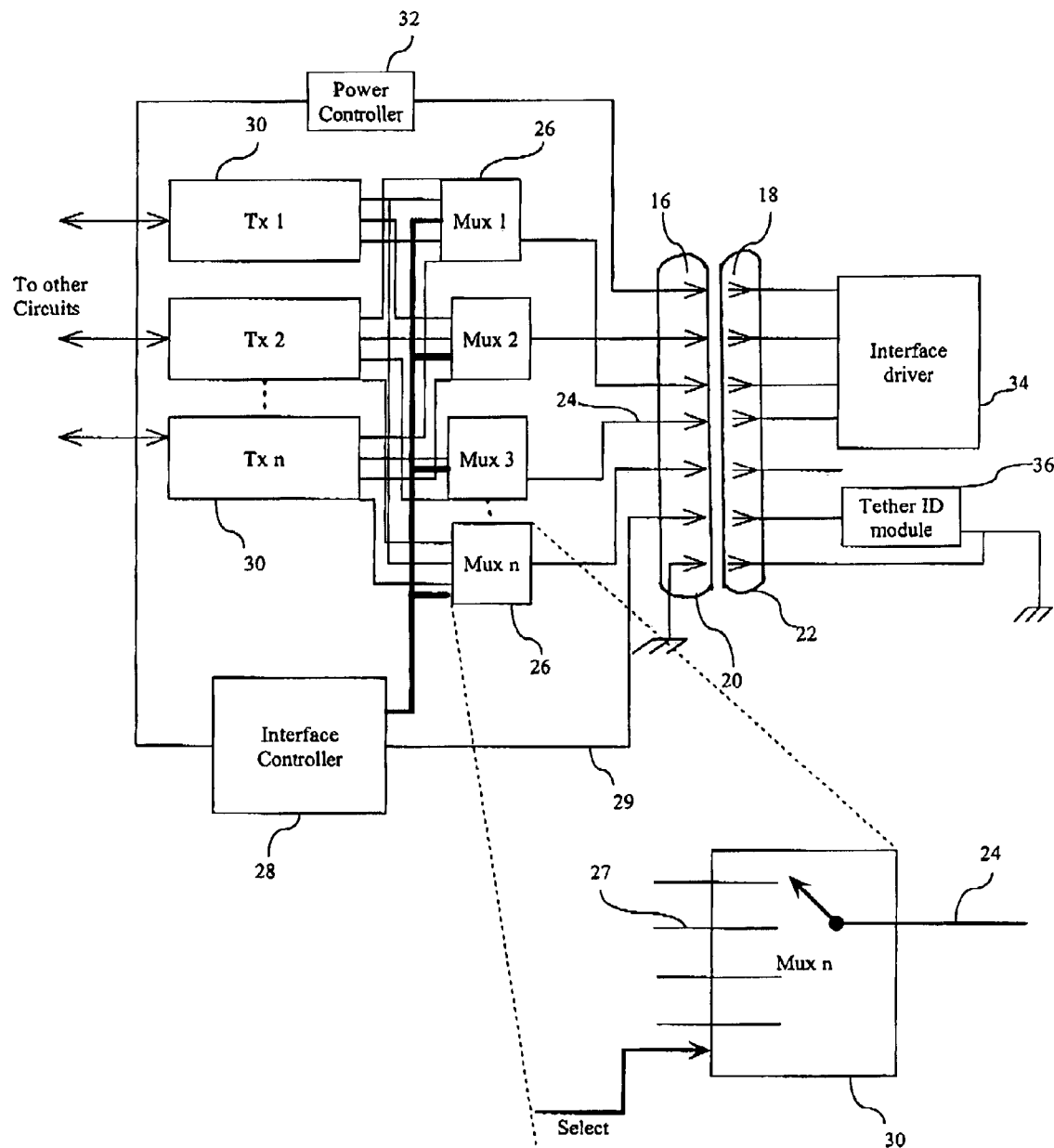
FIG. 3 is a schematic diagram of an interface system.

Referring to FIG. 1, a hand held scanner 12 has a body 4 with a keypad 6 and a scanner window 8. The scanner 2 is used to collect information by scanning bar codes and the like and subsequently transfer such information to a peripheral device 14, such as a printer. Data is transferred over a communication system 10 shown in more detail in FIGS. 2 and 3. Communications network 10 has a data terminal equipment (DTE) 12 embodied in the scanner 2, and a data circuit-terminating equipment (DCE) 14 embodied in the peripheral 14 communicatively coupled to each other via an interface system 13. The DTE 12 may be a computer, a handheld device or a laptop computer, while the DCE 14 may be one of a number of devices such as a printer or a modem. An example of a handheld device operating as a DTE 12 is a Model No. 7535 Hand-Held computer from Psion Teklogix of Mississauga, Ontario, Canada. Generally, a DTE 12 includes a computer readable medium with instructions, data and an operating system, input and output means, and a processor for executing the instructions.

The data is transferred between the DTE 12 and respective ones of the DCE 14 according to a predetermined communication protocol through the DTE electrical interface 16 or port, and the port 18 of the DCE 14. Typically, the communication protocol is defined by a standards body such as the Electronic Industries Association/Telecommunications Industry Association (EIA/TIA), whose standards define electrical interfaces such as EIA/TIA-232, EIA/TIA-449, EIA/TIA-530, and EIA/TIA-530A. Each of the DCE's 14 may utilize a different standard or may require a different set of signals even if using the same protocol so that the number of interfaces typically corresponds to the number of DCEs that may be used.

In practice, however, the number of connectors required is typically less than that specified in the standard. The DTE port 16 and DCE port 18 are provided with complementary male and female connectors, 20, 22, having connector pins 24. The number of pins 24 corresponds to the maximum number of connectors required to enable data transfer in accordance with any of the protocols required for the specific set of DCE's. For example, if one of the DCE's implements an EIA 232 protocol and needs only 10 pins and the other DCE's implement RS 232 protocols needing 9 pins, then the maximum number of pins required is 10.

Each of the pins 24 of the connector 20 is connected to a respective one of a set of bi-directional multiplexers 26. Each of the multiplexers 26 has a set of outputs 27 corresponding to the number of interfaces required plus one for a null position. The outputs are connected selectively to respective ones of a set of transceivers 30 so that each transceiver is connected through the multiplexers 26 to the pins needed to implement the data transfer. Each of the transceivers 30 is configured for a particular interface and connects the multiplexer outputs to circuits within the DTE.

Each of the multiplexers 26 functions as a multiple position switch having 1 input and n outputs. Selection of the output is performed by a control signal 29 obtained from an interface controller 28. The controller 28 receives an identification signal 31 from a tether identification module 36 in the DCE 14 that uniquely identifies the device and required interface. The data exchange protocol is implemented in the DCE by an interface driver 34 connected to the pins 24 of the connector 22.

The interface driver circuit 34 is based on a particular electrical interface standard for the peripheral interface 18. The interface driver circuit 34 includes transmitters, which accept TTL (transistor-transistor logic) or CMOS (complimentary metal-oxide-semiconductor) inputs and outputs the respective electrical interface standard signals, and the receivers of the interface driver circuit 34 converts electrical interface standard input signals to TTL or CMOS signals.

Electrical power to the controller 28 and driver 34 is provided by a power controller 32.

Each of the transceivers 30 provides output signals to each of the multiplexers 26, such that an appropriate transceiver 30 is selected by the multiplexers 26 based on the characteristics of the interface driver circuit 34 as indicated by the tether ID signal 29. The tether identification signal 29 selects pins 24 by a selection signal from the interface controller 28, and determines as to which of the plurality of a particular transceiver 30 output signals are to be coupled to the connector.

Each of the transceivers 30 provides output signals to each of the multiplexers 26, such that an appropriate transceiver 30 is selected by the multiplexers 26 based on the characteristics of the interface driver circuit 34 as indicated by the tether ID signal 29. The tether identification signal 29 generates pins 24 by a selection signal from the interface controller 28, and determines as to which of the plurality of a particular transceiver 30 output signals are to be coupled to the connector.

In operation, when a DCE interface 18 is coupled to the DTE interface 16, the interface controller 28 detects the presence of a tether ID signal 29 issued by the tether determination module 36. This ID signal indicates the electrical interface standard specific to that external device 14. The tether ID signal is then interpreted by the interface controller 28, which then provides an input channel SELECT control signal to the multiplexers 26 causing each of the multiplexers 26 to select one of its outputs. The appropriate one of the transceivers 30 is then connected through the multiplexers 26 to the pins 24. The other transceivers 30 are isolated. Connectors of a different DCE 14 provide a different identifier signal and selection of a different output for each of the multiplexers 26. When no device is attached to the port 16, the multiplexers 26 select the null pin that properly terminates each of the signal lines.

The interface system 13 also includes a power controller 32 that controls power to the device 14, by enabling power thereto when that device 14 is attached to the tether port 16 after the appropriate interface routing has been established. The power controller 32 may also minimize power consumption in the DTE 12 in the instance when no device 14 is attached to the tether port 16, by disabling power to the multiplexers 26. The power controller 32 monitors whether the tether port 16 is in use by detecting whether a peripheral device 14 is present, this can be typical achieved by periodically detecting the tether ID signal. Generally, when a peripheral device 14 is not present, the signals at the bidirectional multiplexer 26 inputs or outputs are set to their null connections which, in general, are a connection to ground via an impedance, such that power to the multiplexers 26 is minimized. The detection of a device 14 by the tether identification module 34 causes the interface controller 28 to activate the multiplexers 26. However, this feature can be overridden with signals that force the device 14 on or off. This feature is useful, because in many applications peripheral devices 14 are used for only short periods of time, and thus conserves battery power.

Therefore, there is provided a multi-protocol port 16 capable of interfacing signals conforming to a plurality of the electrical interface standards. The multi-protocol port 16 is coupled to a plurality of selectable circuits, each of said circuits being associated with an electrical interface standard and selectable via a mode-select input signal in order to facilitate communication with a peripheral device coupled to the port 16. Thus, it is seen that a multi-protocol port 16 is presented which can be selectably automatically configured to conform to a plurality of electrical interface standards, and employs a minimum number of connector pins 24.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A data terminal equipment (DTE) comprising:
   a port;
   one or more signal lines connected to said port to establish a communication path;
   a set of transceivers, each transceiver being associated with a respective circuit in said DTE to establish communication along said communication path in accordance with a selected protocol, said port being configured to connect to a corresponding part of a data circuit-terminating equipment (DCE) to effect communication between said DTE and said DCE via said selected protocol;
   a switch in each of said one or more signal lines, each of said switches having a set of connections with each of said transceivers; and
   an interface controller for providing a control signal to condition said switches to connect each of said one or more signal lines with a selected one of said transceivers said port being connected to selected ones of said circuits in said DTE through said selected one of said transceivers, said interface controller receiving from said DCE through said port, a protocol identifier independent of said one or more signal lines and indicative of said selected protocol to enable said interface controller to condition said switches according to said selected protocol as indicated by said protocol identifier; and
   a power controller for controlling power to said switch in each of said one or more signal lines, depending on whether said port is coupled to said DCE.

2. The DTE of claim 1 wherein said selected protocol is defined by one of a plurality of electrical interface standards.

3. The DTE of claim 2 wherein said plurality of electrical interface standards include at least one of ELA/TIA-232, EIA/TIA-449, EIA/TIA-530, EIA/TLA-530A and IEEE 1284 standards.

4. The DTE of claim 1 wherein said interface controller provides said control signal to said switches, said control signal being dependent on said protocol identifier.

5. The DTE of claim 1 wherein said power controller controls electrical power to said switches depending on the detection of said protocol identifier.

6. The DTE of claim 5 wherein said power controller enables said DCE coupled to said port after said selected protocol has been determined.

7. The DTE of claim 1 wherein said power controller disables said power to said switches depending on the detection of said protocol identifier.

8. The DTE of claim 7 wherein said power controller disables said power to said switches when said protocol identifier is not detected.

9. An interface system for coupling a plurality of signals between a DTE and a DCE via a plurality of communication paths, said system having:
   a DTE port having one or more first signal lines, each for establishing one of said plurality of communication paths, said DTE having a set of transceivers, each of said transceivers being associated with a respective circuit in said DTE to establish communication along said communication paths in accordance with a selected protocol;
   a DCE port having one or more second signal line, each for establishing one of said plurality of communication paths with a corresponding one of said first signal lines of said DTE, said DCE having an interface driver circuit to establish communication along said communication paths in accordance with said selected protocol;
   a switch in each of said one or more first signal lines, each of said switches having a set of connections with each of said transceivers;
   an interface controller for providing a control signal to condition said switches to connect pairs of corresponding first signal lines with a selected one of said transceivers, said DCE port providing a protocol identifier to said interface controller through said DTE port, said protocol identifier being independent of said one of more first signal lines and one of more second signal lines and indicative of said selected protocol to enable said interface controller to condition said switches according to said selected protocol as indicated by said protocol identifier, and
   a power controller for controlling power to said switch in each of said one or more first signal lines, depending on whether said DCE is coupled to said DTE through said DCE port and said DTE port.

10. The system of claim 9 wherein said plurality of communication paths include a plurality of connector pins to provide said plurality of communication paths between said DTE and said DCE.

11. The system of claim 10 wherein said selected protocol is defined by one of a plurality of electrical interface standards, said plurality of connector pins including a minimal number of predetermined connector pins, said minimal number of predetermined connector pins being determined by any one of said plurality of electrical interface standards having the greatest number of signals needed for communication.

12. The system of claim 9 wherein said selected protocol is defined by one of a plurality of electrical interface standards, said plurality of electrical interface standards including at least one of EIA/TIA-232, EIA/TIA-449, EIA/TIA-530, EIA/TIA-530A and IEEE 1284 standards.

13. The system of claim 9 wherein said power controller controls electrical power to said DCE when said DTE and said DCE are in a coupling position.

14. The system of claim 13 wherein said power controller disables electrical power to said switches when said DTE and said DCE are in a non-coupling position, thereby minimizing power consumption by DTE.

15. The system of claim 14 wherein said power controller disables said power to said switches depending on the detection of said protocol identifier.

16. The system of claim 15 wherein said power controller disables said electrical power to said switches when said protocol identifier is not detected.

17. A system for multi-protocol port coupled to a plurality of selectable circuits, each of said circuits being associated with an electrical interface standard and selectable via a mode-select input signal in order to facilitate communication with a device coupled to said port, said device having a circuit based on one of said electrical interface standards, said system comprising:

a plurality of signal lines for connecting a selected one of said selectable circuits with said circuit based on one of said electrical interface standards, each of said plurality of signal lines having a switch with connections to each of a plurality of transceivers, said switches operating in response to a control signal provided by en interface controller to connect said port with said selected one of said selectable circuits, said interface controller operating in response to a protocol identifier provided by said device, said protocol identifier being independent of said plurality of signal lines and indicative of said selected protocol to enable said interface controller to condition said switch in each of said plurality of signal lines, according to said selected protocol as indicated by said protocol identifier; and a power controller for controlling power to said switch in each of said plurality of signal lines, depending on the detection of said protocol identifier.

18. The system of claim 17 wherein said power controller disables said power to said switches when said protocol identifier is not detected.

* * * * *

UNITED STATES PATENT AND TRADEMARK OFFICE
CERTIFICATE OF CORRECTION

PATENT NO. : 7,401,162 B2
APPLICATION NO. : 10/624507
DATED : July 15, 2008
INVENTOR(S) : Baker et al.

It is certified that error appears in the above-identified patent and that said Letters Patent is hereby corrected as shown below:

On the Title Page, in Item (75), under "Inventors", in Column 1, Line 1, delete "Missisauga" and insert -- Belfountain --, therefor.

In the Drawings:
In Fig. 1, Sheet 1 of 3, delete "Fig. 1" and insert -- Figure 1 --, therefor.

In the Specifications:
In Column 1, Line 19, delete "ELI/TIA" and insert -- EIA/TIA --, therefor.

In Column 1, Line 24, delete "Industry" and insert -- Union --, therefor.

In Column 2, Line 33, delete "transceivers" and insert -- transceivers. --, therefor.

In Column 3, Line 7, delete "DESCRIPTION" and insert -- DETAILED DESCRIPTION --, therefor.

In the Claims:
In Column 5, Line 28, in Claim 1, delete "part" and insert -- port --, therefor.

In Column 5, Lines 53-54, in Claim 3, delete "ELA/TIA-232, EIA/TIA-449, EIA/TIA-530, EIA/TLA-530A" and insert -- EIA/TIA-232, EIA/TIA-449, EIA/TIA-530, EIA/TIA-530A --, therefor.

In Column 6, Line 13, in Claim 9, delete "line," and insert -- lines, --, therefor.

In Column 6, Line 27, in Claim 9, delete "one of" and insert -- one or --, therefor.

In Column 6, Line 28, in Claim 9, after "and" delete "one of" and insert -- one or --, therefor.

In Column 7, Line 11, in Claim 17, delete "en" and insert -- an --, therefor.

Signed and Sealed this
Twenty-third Day of April, 2013

Teresa Stanek Rea
*Acting Director of the United States Patent and Trademark Office*